US008656050B2

(12) United States Patent
Chu et al.

(10) Patent No.: US 8,656,050 B2
(45) Date of Patent: Feb. 18, 2014

(54) METHODS AND SYSTEMS FOR EFFICIENTLY CONFIGURING IP-BASED, VIRTUAL PRIVATE NETWORKS

(75) Inventors: Thomas P. Chu, Englishtown, NJ (US); Paul F. Gagen, Califon, NJ (US); Paul G. Justl, Chester, NJ (US)

(73) Assignee: Alcatel Lucent, Paris (FR)

( * ) Notice: Subject to any disclaimer, the term of this patent is extended or adjusted under 35 U.S.C. 154(b) by 2393 days.

(21) Appl. No.: 10/252,796

(22) Filed: Sep. 24, 2002

(65) Prior Publication Data

US 2004/0059831 A1    Mar. 25, 2004

(51) Int. Cl.
*G06F 15/173* (2006.01)

(52) U.S. Cl.
USPC ........... 709/242; 709/252; 709/238; 370/355; 370/409

(58) Field of Classification Search
USPC ......... 709/220, 221, 223–226, 229, 238, 242, 709/252; 370/355, 356, 409
See application file for complete search history.

(56) References Cited

U.S. PATENT DOCUMENTS

| | | | |
|---|---|---|---|
| 4,864,563 A * | 9/1989 | Pavey et al. | 370/254 |
| 6,205,488 B1 * | 3/2001 | Casey et al. | 709/238 |
| 6,590,681 B1 * | 7/2003 | Egnell et al. | 398/82 |
| 6,754,450 B2 * | 6/2004 | Chang et al. | 398/51 |
| 6,789,121 B2 * | 9/2004 | Lamberton et al. | 709/227 |
| 6,880,005 B1 * | 4/2005 | Bell et al. | 709/225 |
| 6,990,103 B1 * | 1/2006 | Gollamudi | 370/395.31 |
| 7,027,396 B1 * | 4/2006 | Golan et al. | 370/232 |
| 2002/0062310 A1 * | 5/2002 | Marmor et al. | 707/3 |
| 2002/0181477 A1 * | 12/2002 | Mo et al. | 370/401 |
| 2002/0191541 A1 * | 12/2002 | Buchanan et al. | 370/230 |

* cited by examiner

*Primary Examiner* — El Hadji Sall
(74) *Attorney, Agent, or Firm* — Capitol Patent & Trademark Law Firm, PLLC

(57) ABSTRACT

Internet-protocol based, virtual private networks are configured by first identifying the basic components of such networks and then efficiently assigning MPLS-based RD and RTs to each component or efficiently generating VR-based access lists for each component.

29 Claims, 8 Drawing Sheets

FULL MESH VPN

ROOT-RECEIVER VPN

ROOT TRANSMITTER VPN

FIG. 5

|  | HQ | DATA CENTER | ENG. | FACTORY 1 | FACTORY 2 | MARKETING | SALES 1 | SALES 2 |
|---|---|---|---|---|---|---|---|---|
| HQ | 1 | 1 | 1 | 1 | 1 | 1 | 1 | 1 |
| DATA CENTER | 1 | 1 |  |  |  |  |  |  |
| ENG. | 1 |  | 1 | 1 | 1 |  |  |  |
| FACTORY 1 | 1 |  | 1 | 1 | 1 |  |  |  |
| FACTORY 2 | 1 |  | 1 | 1 | 1 |  |  |  |
| MARKETING | 1 |  |  |  |  | 1 | 1 | 1 |
| SALES 1 | 1 |  |  |  |  | 1 | 1 | 1 |
| SALES 2 | 1 |  |  |  |  | 1 | 1 | 1 |

FIG. 7

|  | DATA CTR 10 | DATA CTR 20 | DATA CTR 30 | BRANCH 40 | BRANCH 50 | BRANCH 60 | BRANCH 70 | BRANCH 80 |
|---|---|---|---|---|---|---|---|---|
| DATA CTR 10 |  |  |  |  |  |  |  |  |
| DATA CTR 20 |  |  |  |  |  |  |  |  |
| DATA CTR 30 |  |  |  | 1 | 1 | 1 | 1 | 1 |
| BRANCH 40 | 1 |  |  |  |  |  |  |  |
| BRANCH 50 | 1 |  |  |  |  |  |  |  |
| BRANCH 60 | 1 |  |  |  |  |  |  |  |
| BRANCH 70 | 1 |  |  |  |  |  |  |  |
| BRANCH 80 | 1 |  |  |  |  |  |  |  |

METHODS AND SYSTEMS FOR EFFICIENTLY CONFIGURING IP-BASED, VIRTUAL PRIVATE NETWORKS

BACKGROUND OF THE INVENTION

Historically, when a company or any other group of people needed to have their computers and the like "networked" together they would contact a local telephone company or another so-called "service provider" ("SP") to assist them. The service provider would design and construct a network using so-called "connection-oriented" technology (e.g., some combination of leased "private lines" and the publicly switched telephone network, dial-up lines or the like).

As is known by those skilled in the art, networks designed using existing connection-oriented technologies have their drawbacks.

In order to overcome the drawbacks inherent in existing network designs, SP based, Internet-protocol ("IP") virtual private networks ("VPNs") have been developed ("IP-VPNs" for short). IP-VPNs are designed using "connectionless" technology. One of the advantages a connectionless network has over a connection-oriented network is that there is no need for an administrator or the like of a network to specify traffic characteristics between two sites or locations (hereafter collectively referred to as "location(s)") in a network. Instead, it is now up to the SP to deliver communication services that are associated with a certain "Quality of Service" ("QoS") level. However, this does allow an SP to manage all of the traffic flowing from each of its customers as an aggregate, resulting in increased efficiencies in both network resource usage and network management.

Two common techniques used to create an SP based, IP-VPN are Multi-Protocol Label Switching ("MPLS") and "virtual routers" ("VR"). It should be understood that both techniques are used to implement VPNs. The MPLS approach is articulated in an Internet protocol proposal Request for Comment ("RFC") 2547 (RFC 2547) entitled *"BGP/MPLS VPN'S"* (as well as in internet draft-rfc2547bis, its second version). The VR approach is in actuality, a family of techniques. Therefore there are a number of possible ways to implement a VR-based, VPN. One implementation is articulated in Internet RFC 2917 entitled *"A Core MPLS IP VPN Architecture"*.

Overly simplified, the difference between an MPLS-VPN and a VR-VPN is that the former uses so-called route distinguishers (RDs) and route targets (RTs) to route communications traffic (e.g., data) from one location in a network to another, while the latter uses so-called "access lists" to accomplish the same thing.

Before discussing the details of the present invention, it may be helpful to introduce some terms which will be used repeatedly throughout the discussion below.

In RFC 2547 (i.e., MPLS-based techniques), an IP network is divided into two tiers, a core network that consists of "core routers", and edge networks that consist of "service provider edge" ("PE") routers. Customer routers are in turn connected to the PE routers. The customer routers that are directly attached to the PE routers are referred to as "customer edge" ("CE") routers. All VPN functions are implemented in the PE routers. Core routers are operable to forward MPLS "packets", (e.g., small bits of data) but they are not assigned VPN tasks. Similarly, CE routers behave as if they are connected to ordinary routers, (e.g., they do not receive information telling them that PE routers are RFC 4547 compliant).

In RFC 2547, a customer location is connected to a PE router through a CE router and the connection is identified via a layer 1 or a layer 2 identifier that can represent: a physical interface ID; a virtual path/virtual circuit identifier of an ATM interface ("ATM" stands for Asynchronous Transfer Mode); a data link connection identifier of a frame relay interface; a virtual local area network identifier of an Ethernet serial link interface; and/or the MPLS label of a MPLS interface. One or more of these interfaces will be referred to hereafter as a "pathway".

A basic requirement for a VPN is that each IP VPN subscriber must be able to use its own private IP addressing scheme. Therefore, each PE router needs to be able to route IP packets based on differing incoming data streams. In theory, this may require a different decision process for each data stream. There are two possible approaches which can be used by a PE router. The first is to create a "routing/forwarding table" for each VPN. The second is to create a single routing/forwarding table with "context" for each VPN. In RFC 2547, the first approach is considered resource and management intensive, so the second approach is utilized.

Routing tables are stored within each PE router. It is the routing tables that contain the instructions, guidelines and the like which tells the PE router how to treat each received data stream. That is to say, each routing table provides directions, for example, on how to handle an incoming data stream, where to route it next, if any action should be taken at all, etc. . . .

The context specific table for each VPN is referred to as a VPN Routing and Forwarding ("VRF") table. Each VRF table is identified by a parameter known as a Route Distinguisher ("RD"). For the sake of efficiency, multiple data streams from different pathways can point to the same VRF. An RD contains two fields that identify the SP and the routing domain within the SP's network. RD assignment is the responsibility of the SP.

To create such VRF tables manually is cost prohibitive and not scaleable. Therefore, a "routing protocol" between PE routers is used to automatically update and synchronize the content of the VRF tables each time locations in the network are added, deleted or modified. In RFC 2547, the routing protocol used is a Border Gateway Protocol with Multi-Protocol Extensions ("BGP-MP"), as specified in RFC 2858 from the Internet Engineering Task Force.

The BGP-MP routing protocol specifies a number of parameters, one of which is called a Route Target ("RT"). A PE uses RTs to "advertise" its routes to other PEs that are considered its "peers". RTs are used to describe the VPN (or "VPN" component) that the route is applicable to. Because a location may belong to multiple VPNs or VPN components, multiple RTs can be associated with a single route.

Both RDs and RTs are known as network wide parameters because they have to be unique across the entire network. To ensure that a VPN is working properly, RDs and RTs must be properly generated and assigned. If the incorrect RT is assigned it may be impossible for one or more PE routers to correctly route packets of data. Furthermore, if RDs are efficiently assigned the number of VRFs in a PE can be reduced, thereby allowing network resources to be conserved. Further still, with efficient RT assignment, it would be unnecessary to reconfigure existing PE routers each time a new location is added resulting in a considerable savings in network management.

RD and RT assignments will change over time because: (1) the networks they are associated with will change as new locations are added, deleted or modified; within such networks; and/or (2) the rules governing the flow of data to and from such locations will change.

There is, therefore, a need in the art for techniques which provide for the proper assignment of RDs and RTs.

In the discussion just concluded we focused on MPLS based techniques for routing data from one VPN to another. As stated earlier, there exists a second technique, the VR approach. We now turn our attention to that technique.

The VR technique involves the generation and use of a number of logical routers (i.e., software, firmware configured to carry out the functions and features of one or more physical routers . . . this technique is sometimes called "emulating" a physical router . . . ). Each logical router is adapted to exhibit the behavioral characteristics of separate physical routers. These logical routers are aptly referred to as virtual routers ("VRs"). In an IP-based VPN, each VPN is assigned a VR within each PE router. The VRs can be connected to each other via a core network and a number of layer 2/layer 3 technologies, such as ATM virtual connections, frame relay connections, IP encapsulation and Layer 2 Tunnel Protocol.

Sometimes, an SP's customer places restrictions on locations in its network (e.g., not all locations are allowed to communicate with each other directly). Because of this, a VR must be able to "filter" packets. That is to say, a VR must be able to, for example, determine whether to forward or discard a packet. The filtering capabilities of VRs are specific to the configuration of each VPN. Most VRs filter packets using at least the fields containing the IP source address, IP destination address, source and destination ports, protocol type and the type of service ("TOS") byte embedded within each packet.

More specifically, each VR is linked or otherwise has access to, one or more "access list(s)". These lists contain the exact instructions on how a VR should treat a received packet.

An access list usually comprises a number of entries or "statements", each of which defines whether a particular packet will be forwarded or dropped based on whether the particular packet satisfies certain criteria. For example, an access list can specify that only packets with particular destination addresses are forwarded, while all others are discarded.

Access lists are assigned to a particular pathway (i.e., a particular interfacer which connects a PE and CE router) in a particular order. In general, for an incoming packet a VR is adapted to match the data packet with criteria specified in a first entry of a first access list. If a match is found, an action specified in the entry will be executed. If a match is not found, the VR is adapted to proceed to the next entry in the access list until a match is found or until the end of the list is reached.

There are two access lists, one transmission and one reception, associated with each pathway. These access lists are stored in PE routers. These two access lists are referred to as "master access lists" or "master lists". Each master list, in turn, comprises a number of sub-access lists. When a new VPN or VPN component is added or deleted, a sub-access list has to be added or deleted from a master access list. In addition, when changes are made to an existing VPN or VPN component (e.g., modifying or removing a location), entries in the corresponding sub-access access lists have to be changed manually. This is labor intensive and leads to many mistakes.

Therefore, there is a need in the art for techniques which provide for the automatic generation and assignment of correct VR access lists automatically.

In general, there is a need in the art for methods and systems for configuring IP-based, VPNs as the VPNs change over time.

BRIEF DESCRIPTION OF THE DRAWINGS

FIG. 5 depicts an example of a connectivity matrix generated according to one embodiment of the present invention.

FIG. 7 depicts an example of a second connectivity matrix generated according to one embodiment of the present invention.

SUMMARY OF THE INVENTION

In accordance with the present invention, a network controller, adapted to identify basic components of a network and to generate routing data for each of the identified components, along with one or more routers make up a system for efficiently configuring IP-based VPNs.

DETAILED DESCRIPTION OF THE INVENTION

As envisioned by the present inventors, one embodiment of the present invention comprises a network controller which is adapted to first identify basic components of a VPN and then to generate routing data for each of the identified components.

In addition, the present invention envisions one or more routers, such as provider, PE routers, each of which is adapted to route communication traffic based of the generated routing data received from the network controller.

The present invention envisions a number of ways in which a network controller can identify basic components of a VPN. To simplify the explanation which follows, the present inventors have selected one example of how this identification may occur. It should be understood that other techniques may be used to identify basic components of a VPN.

The discussion which follows will first concentrate on the identification of these basic components. Thereafter, we will discuss two techniques for generating routing data for each of the components identified. The first technique being an MPLS based technique; the second being a VR technique.

Figure 1:
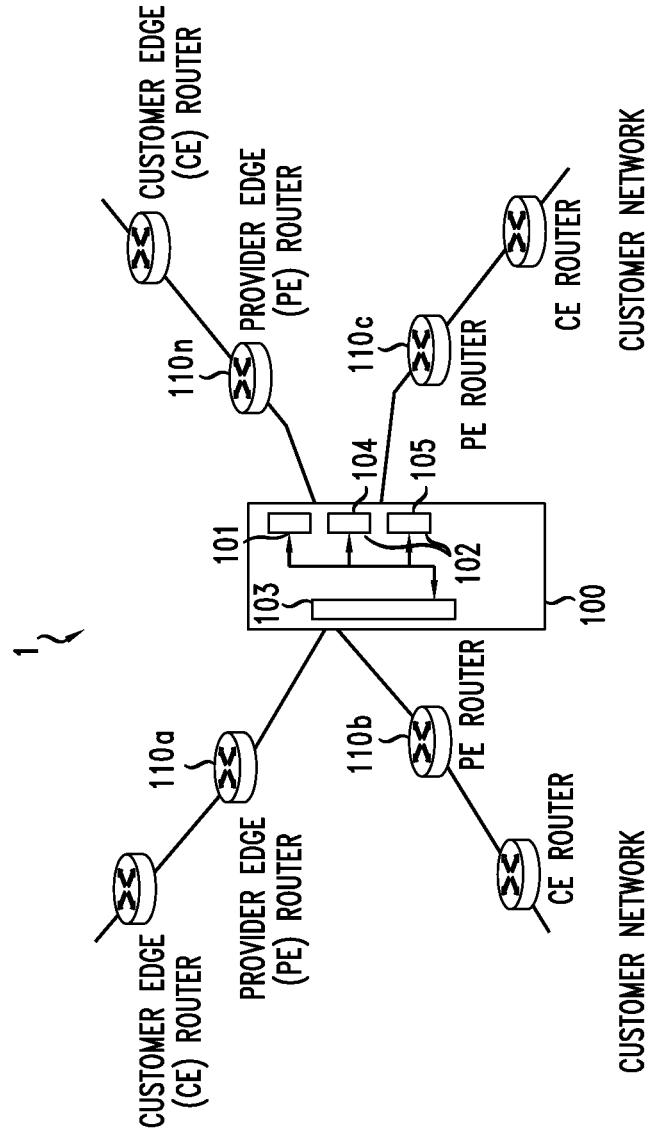
FIG. 1 depicts a simplified block diagram of a network used to illustrate features of the present invention.

Referring now to FIG. 1 there is shown a simplified block diagram of a network 1. As shown the network 1 comprises a controller 100 and one or more PE routers $110a$, $110b$, . . . $110_n$ (where "$_n$" represents the last PE router making up a network).

In one embodiment of the present invention, the network controller 100 comprises an identification section 101 and a data routing generator 102. The identification section 101 is adapted to identify the basic components of all of the VPNs which are a part of network 1. Routing generator 102 is adapted to generate routing data for each of the components identified by section 101.

Once the routing generator 102 has generated the appropriate data, it is sent to the appropriate PE router(s) $110_a$, $110_b$, . . . $110_n$. In an additional embodiment of the present invention, the controller 100 comprises an interface section 103 which is adapted to transfer the generated data to one or more of the PE routers $110_a$, $110_b$, . . . $110_n$.

It should be understood that the basic components identified by the identification section 101 can take on a variety of different configurations. Typically, an SP (e.g., telephone company) which is operating network 1 must obtain a description of a customer's VPN. Depending on the customer, some may or may not be capable of providing the SP with the description of their VPNs or the basic components making up their VPNs. In fact, typically, a customer is only capable of describing their network in terms of "connectivity" requirements between various locations in the network. For this reason, the present inventors have envisioned a technique which will allow the identification section 101 to identify these basic components. Again, as stated before, this technique is only one of many which may be used.

Before turning to the technique itself, it may be useful to discuss, generally speaking, the different types of components which typically make up a VPN. The first component is a "full mesh" component. It is the most common and basic type of component in a VPN. A full mesh component can be generated (i.e., created) by grouping together locations belonging to a particular VPN component that are permitted to send and receive packets to, and from, one another.

There are two other types of basic components. One is called a "root-receiver" component (root-receiver for short) and the other is called a "root-transmitter" component (root-transmitter for short). When many locations are logically connected to one common location, the common location is called a "root". Both root-transmitter and root-receiver components have a tree-like topology where a location acts as the "root" of the tree and a number of locations act as the "leaves" of the tree. In a root-receiver VPN component, all of the leaves are allowed to transmit to a root. However, a root cannot transmit to the leaves.

Figure 2:
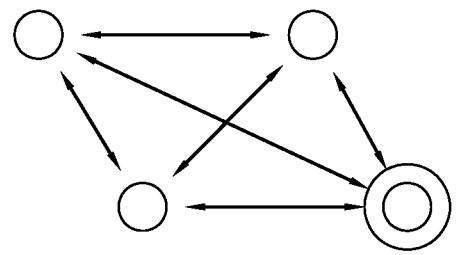
FIG. 2 depicts three basic types of components making up a VPN.
Figure 2:
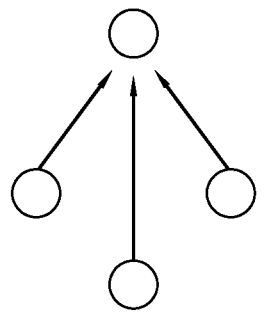
Figure 2:
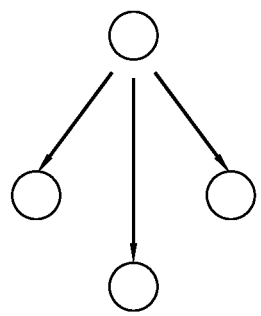

A root-transmitter is substantially the opposite of a root-receiver. That is, a root-transmitter is identified by the fact that the root is allowed to transmit to a number of leave locations but the leaves cannot transmit to the root. Each of the three basic types of components are shown in FIG. 2.

Figure 3:
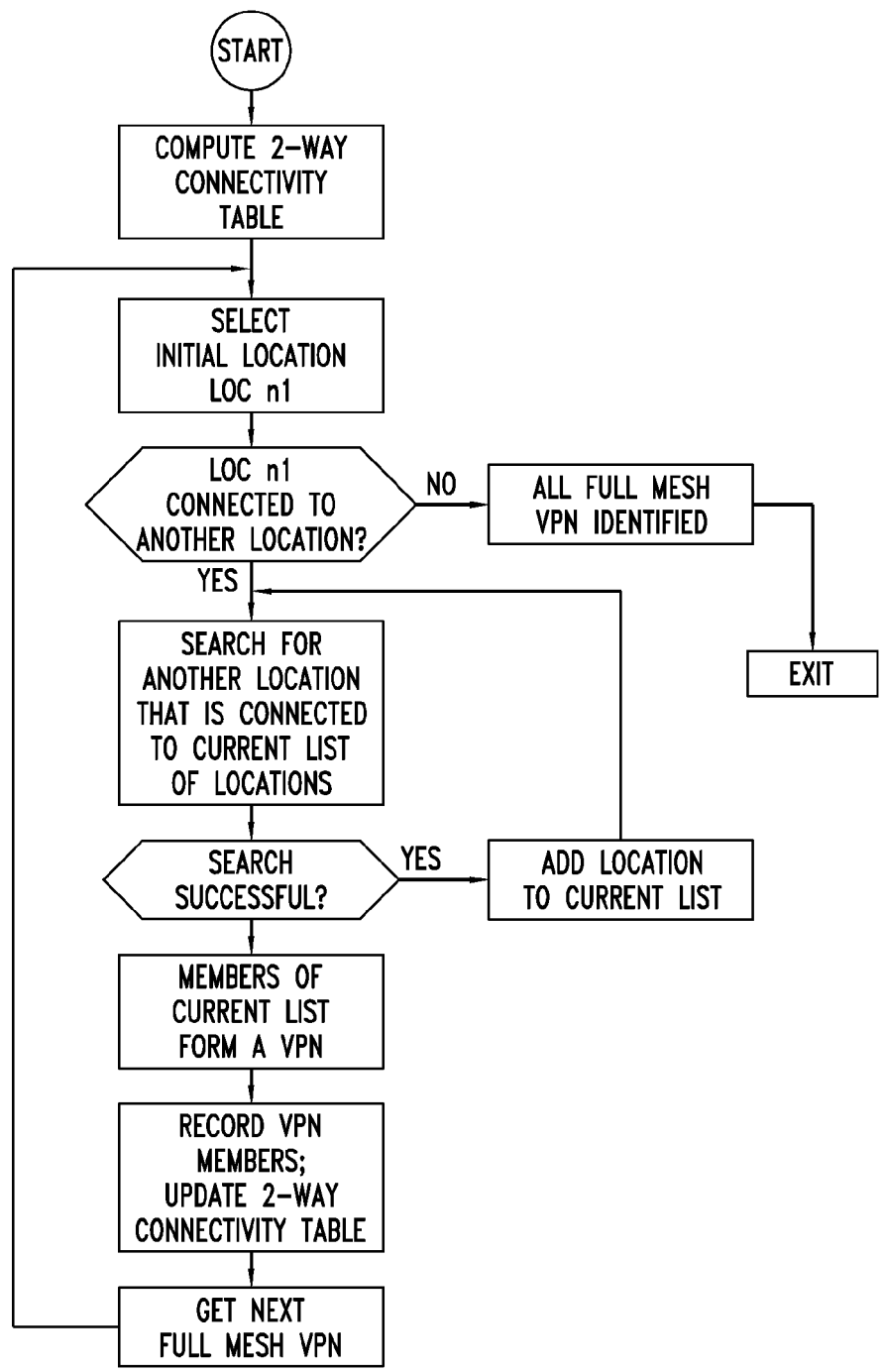
FIG. 3 depicts a simplified flow diagram of a technique for identifying full mesh components of a VPN according to one embodiment of the present invention.

Referring now to FIG. 3, there is shown a simplified flow diagram of one technique for identifying all full mesh components of VPNs in a given network some of which will be discussed below.

Figure 4:
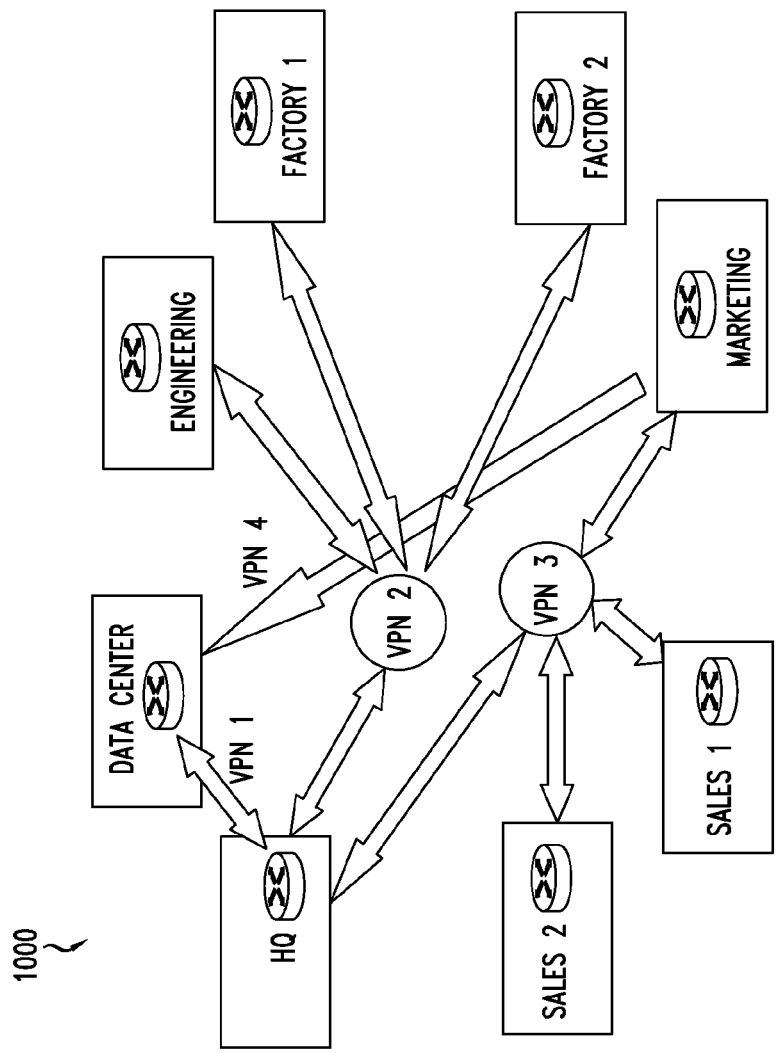
FIG. 4 depicts an example of a network of VPNs.

In one embodiment of the present invention, the identification section 101 is adapted to generate a first connectivity matrix based on two-way communication paths associated with some or all of the locations in one or more VPNs. One example of a network 1000 of VPNs is shown in FIG. 4 while its associated connectivity matrix is shown in FIG. 5. In one embodiment of the present invention, each row and column in the connectivity matrix shown in FIG. 5 represents a location in network 1000. As will be recognized by those skilled in the art, this first connectivity matrix is symmetrical because each connection is a bi-directional connection. In addition, any location in the network 1000 can send to itself thereby making the main diagonal of the matrix equal to "1". It should be understood that the terms "bi-directional connection" and "full mesh component" are used to describe the same set of circumstances in a given network. In an illustrative embodiment of the present invention, section 101 is adapted to construct the first connectivity matrix so that the identification section 101 can identify all maximal, full mesh components associated with VPNs within network 1000 from the first matrix.

In more detail, the identification section 101 is adapted to operate as follows. The identification section 101 is adapted to randomly select any network location within the matrix connected to some other location. For example, the identification section 101 may be adapted to identify a network location such that, apart from the main diagonal shown in FIG. 5, some entry in a row or column associated with the randomly selected network location is equal to "1". If such a network component cannot be found, then the identification section 101 has already identified all of the full mesh components. The process of identifying full mesh components therefore ceases. If, on the other hand, a network location is identified, then section 101 is adapted to add the location to a list of previously identified full mesh components. The list of identified full mesh components may be stored in any number of memory devices (not shown in FIG. 1). This process of identifying locations within the connectivity matrix which have values equal to "1" continues until all of the full mesh components in the matrix have been identified.

It should be understood, that after every full mesh component has been identified for each VPN shown in FIG. 4, the identification section 101 is adapted to update the connectivity matrix shown in FIG. 5 by resetting any values which have been set to "1" to "0". Identification section 101 is then adapted to create a connectivity matrix for the next VPN shown in FIG. 4. The identification section 101 is adapted to repeat this process of identifying all full mesh components in each VPN of the network shown in FIG. 4 until such time as all full mesh components for all the VPNs have been identified. Before going further, it should be noted that although the identification section 101, routing generator 102 and interface section 103 are shown as separate sections within controller 100, it should be understood that these sections may be combined into fewer sections or further broken down into additional sections. Also, each "section" may, in fact, comprise one or more software or firmware programs adapted to carry out the features and functions of the present invention. That is not to say that the sections making up the controller 100 shown in FIG. 1 must be realized completely in software or firmware. Rather, the sections shown in FIG. 1 may be realized in a combination of hardware, software, firmware or the like.

In an alternative embodiment of the present invention, the identification section 101 may use additional steps to identify all full mesh components in the network shown in FIG. 4. These additional steps can be added at the beginning of each iteration to increase the speed of the identification process. For example, if two locations have identical rows (or columns) that are connected to each other, they can be grouped into a single entry. A network location whose row (or column) has only "1" on a main diagonal and a "0" elsewhere can be deleted. This is because this network location is not connected to any other network element. This situation usually results at the end of an iteration, after a connectivity matrix is updated and all of the VPNs that the network location belongs to have been identified.

In a further embodiment of the present invention, the identification section 101 is further adapted to select a network location at the beginning of each iteration that has the most "1"s in its row. The rationale behind this type of selection is to select a network location that is connected to a lot of other network locations, thus increasing the probability that the network location belongs to the largest VPN. By so doing, the identification of full mesh VPNs is sped up.

Figure 6:
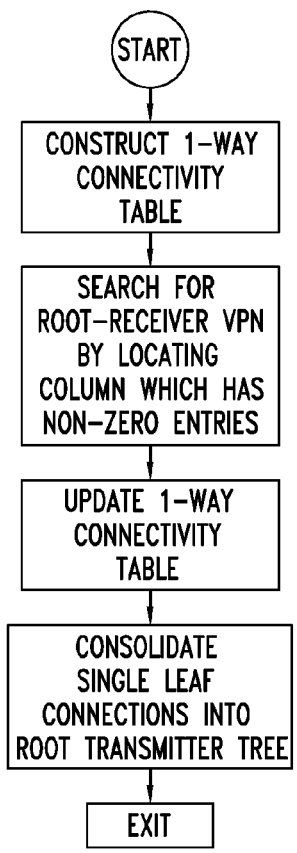
FIG. 6 depicts a simplified, iterative flow diagram of a technique to identify root-receiver and root-transmitter components of a VPN according to one embodiment of the present invention.

Full mesh components are only one type of basic component. In one embodiment of the invention, after the identification unit 101 has identified all of the full mesh components it is further adapted to identify all root-receiver and root-transmitter components. Root-receiver and root-transmitter components are extracted from one-way connections associated with the VPNs shown in FIG. 4 (not two-way, as is the case for full mesh components). FIG. 6 depicts a simplified, iterative flow diagram of a technique which may be used to identify root-receiver and root-transmitter components according to one embodiment of the present invention.

Initially, the identification section 101 is adapted to identify all one-way transmission connections from the VPNs/locations shown in FIG. 4 and then to generate a second connectivity matrix. An example of such a matrix is shown in FIG. 7. The root-receiver and root-transmitter VPNs are extracted from the one-way connections represented by this second matrix according to the rules which follow.

In one embodiment of the invention, the identification section 101 is first adapted to identify the root-receiver VPNs within network 1000 by identifying those columns within the second matrix which contain some non-zero entries (e.g., "1"). Using the terminology introduced previously above, the number of "leaves in each tree" is equal to the number of '1's in each column. After having identified every non-zero entry, the identification section 101 is further adapted to update the second matrix by deleting all the transmission connections that are part of a tree with more than a single leaf (these transmission connections are inherently identified in the previous step). In one embodiment of the present invention, the identification section 101 may be adapted to delete such transmission connections by setting all columns within the second matrix that contain more than one '1' to '0'.

Next, the section 101 is further adapted to consolidate all of the remaining transmission connections into root-transmitter trees by looking at each row of the second connectivity matrix. As envisioned by the present invention, the identification section 101 is adapted to consolidate all transmission connections in the same row into a single transmitter tree.

This process may be repeated until all of the root-receiver and root-transmitter components have been identified. Again, at this point the values in the second matrix are set to "0". The identification section 101 has now identified all of the basic components of all of the VPNs within network 1000.

As noted above earlier, the technique just outlined for identifying all of the basic components of the VPNs within a network is one of many that can be used. In an alternative embodiment of the present invention, the identification section 101 is adapted to identify the root-transmitter components first and then the root-receiver components. Further, section 101 can be adapted to identify any full mesh component that has only two members ( . . . identified using the first matrix . . . ) and share a common location can be converted or combined into a pair of one way connections (i.e., a root-receiver and/or a root transmitter component) according to a set of rules:
  First, identify all the two-member full-mesh VPN components that share a common member (or location);
  convert the above group into a single root-transmitter and a root receiver VPN component with the common member (or location) as the root; and
  repeat the two steps immediately above, until all two-member, full-mesh VPN components having common members are identified.

As will be apparent to those skilled in the art, the initial steps in the technique described above amount to a systematic method for identifying the basic components of a network. Deciding which technique is the "best" technique, depends on many factors, such as the evolution of the network. The technique just described will result in the identification of basic components. It should be understood that, the greater the detail and accuracy of the information supplied to an SP by a customer concerning its VPN(s), the better the results will be using the identification technique described above.

Considering much of what that has been discussed so far, the identification section 101 can be optimized to identify components of a network as follows:
  After all full mesh components are identified, section 101 is then adapted to identify full mesh components that have only two members and then group them into subgroups so that all VPNs in the subgroup share an identical location; and
  If desired, (i.e., by a client whose members make up the network) the section 101 can be adapted to replace all such groups by a single root-receiver VPN component and a single root-transmitter VPN component, with a common member as the root.

After the basic components of a network have been identified, the present invention envisions that the data routing generator 102 shown in FIG. 1 is adapted to generate routing data based on the components identified and their relationships to one another. Routing generator 102 is adaptable to generate routing data for both MPLS and VR based-VPNs.

Figure 8:
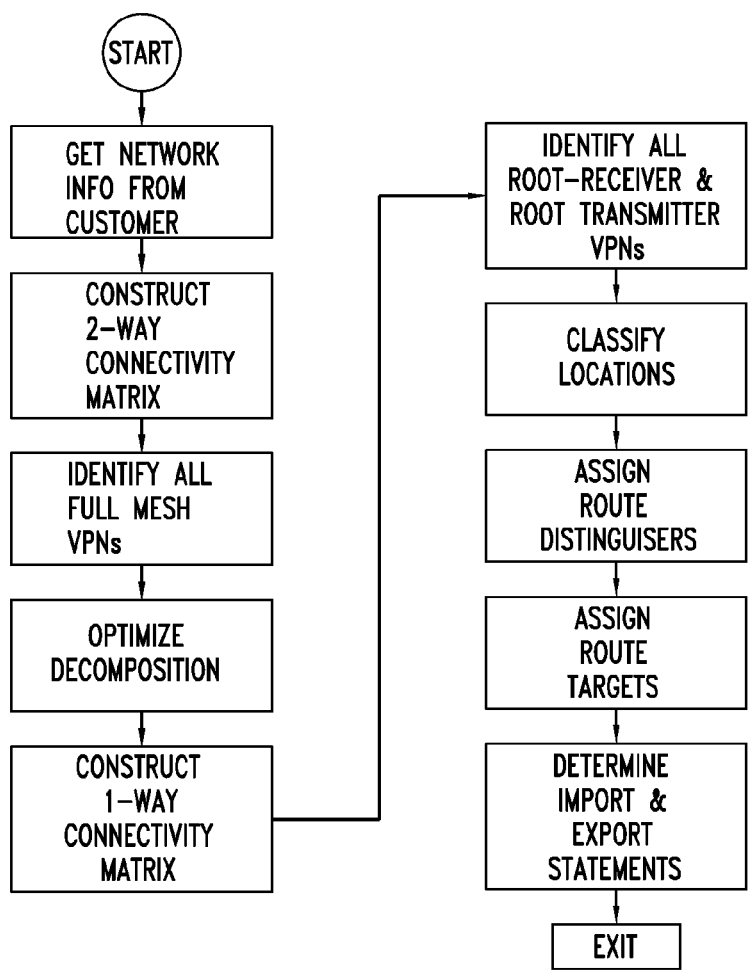
FIG. 8 depicts a simplified flow diagram of a technique for identifying basic components of an MPLS-based VPN and the generation and assignment of RDs and RTs according to embodiments of the present invention.

We will discuss MPLS-based VPNs first. FIG. 8 depicts a simplified flow diagram of a technique for identifying the basic components of an MPLS-based VPN as well as the generation and assignment of RDs and RTs for an MPLS-based VPN according to one embodiment of the invention.

In one embodiment of the present invention, the routing generator 102 shown in FIG. 1 comprises an RD assignment section 104 adapted to generate and assign RDs to network components identified by the identification section 101 and an RT assignment section 105 adapted to generate and assign RTs.

An RD is a value or a "tag" so to speak that is assigned to each PE router $110_a$, $110_b$ . . . $110_n$, by the controller 100 via section 103. Upon receiving an RD, a router $110_a$, $110_b$ . . . $110_n$, is adapted to generate VRF tables from the received RTs. Generally, an RD value contains two fields: a field that identifies the SP and a field that identifies the RD in the SP's network. In one embodiment of the invention, the RD assignment section 104 is adapted to assign one RD to all locations that are members of the same, identified full-mesh VPN component. In addition, the section 104 is adapted to assign a single, unique RD to each location which is part of a root-receiver or root transmitter, identified component.

As mentioned above, an RT assignment section 105 is adapted to assign RTs. In one embodiment of the present invention, section 105 is adapted to assign RTs as follows:
  Each full mesh VPN component is assigned its own RT. This allows each member of a full mesh VPN component the ability to "export" and "import" the assigned RT;
  Each root transmitter VPN component is assigned its own RT. This allows each branch of a VPN component the ability to export the RT, and the root of the VPN component to import the RT; and
  Each root receiver VPN component is assigned its own RT. This allows each branch of a VPN component with the ability to import the RT, and the root of the VPN to export the RT.

The terms "import" and "export" are described in RFC 2547. In general, if a location wants to receive packets associated with a particular VPN component, it would export the RT associated with the particular VPN by "advertising" the RT via a routing protocol. If a location is authorized to transmit data associated with a particular VPN component, it would import a route advertisement, with a matching RT, into its VRF table.

Backtracking somewhat, in another embodiment of the invention, the identification section 101 can be adapted to identify all root-transmitter and root-receiver VPN components that have the same branches. Two root-transmitter (or two root-receiver) VPN components that have the same branches are referred to as being "equivalent". It can be said that the section 101 can be further adapted to associate components having the same branches to an equivalent root-transmitter or root-receiver component (which ever applies).

Consistent with such an embodiment the route generator 102 can be adapted to assign the same RT to an equivalent root transmitter (or root receiver) VPN component and to assign the same RD to the roots of equivalent root transmitter (or root-receiver) VPN components as long as all of the roots belong to the same full mesh VPN component.

In one embodiment of the invention, the network interface section 103 shown in FIG. 1 is adapted to transfer the assigned RDs and RTs (i.e., routing data) to the one or more routers $110_a$, $110_b$ ... $110_n$, using a Simple Network Management Protocol ("SNMP") or similar protocol. The routers $110_1$, $110_b$ ... $110_n$, are then adapted to construct VRF tables based on the transferred RDs, RTs and BGP-MP route advertisements as specified in RFC 2547. Once the VRF tables are constructed, the routers $110_a$, $110_b$ ... $110_n$ are adapted to route communications traffic using the so-constructed tables.

As the configuration of network 1000 changes and new basic components are formed, the RD and RT assignments must, for the most part, change as well. In one embodiment of the invention, the controller 100, via section 103 is adapted to repeatedly transfer updated routing data (e.g., RDs and RTs) to the routers $110_a$, $110_b$ ... $110_n$.

The routing generator 102 is also adapted to generate routing instructions for VR based, VPNs. In a VR-based IP-VPN, each VPN is assigned a single VR within a PE router. It should be understood that each PE router may comprise a number of VRs, one for each VPN. It should be further understood that if a customer of an SP has more than one UPN, each VPN is assigned its own VR.

VR-based VPNs do not use RDs and RTs. Instead, "access lists" are used to control the flow of traffic. These access lists are generated by the generator 102 and transferred to routers $110_a$, $110_b$ ... $110_n$, via section 103 so that each VR in a PE router can control the routing of communications traffic.

As mentioned above earlier, associated with each pathway between a customer location and a VR are two access lists, one for transmitting traffic to, and one for receiving traffic from, a network.

In one embodiment of the invention, the generator 102 is adapted to generate and transfer to each router $110_a$, $110_b$ ... $110_n$, two master access lists for each such pathway (so-called "RECEIVE" and "SEND" lists discussed below). Further, each of the master access lists comprises a number of sub-access lists each sub-access list being associated with a single VPN component.

In one embodiment of the invention, when an incoming packet arrives at a router, the router is adapted to forward the packet to a first VR (i.e., within the PE). Thereafter, the VR is adapted to compare the incoming packet with criteria specified in the first entry of the first access list. If there is a match, the router is adapted to execute or otherwise carry out the actions as specified in the entry. If not, the VR is adapted to proceed to the next entry in the first access list until a match is found or the last access list is exhausted. Thereafter, the incoming packet would be discarded and the next incoming packet would undergo the same comparison process.

The operation of the routing generator 102 in a VR-based VPN mode will now be discussed in more detail. According to one embodiment of the present invention, the routing generator 102 is adapted to generate a RECEIVE and a SEND master access list of Internet protocol addresses based on VPN components identified by the identification section 101 for each network pathway. The routing generator 102 is further adapted to reduce the size of the access lists by substantially summarizing the Internet addresses. Address summarization involves combining two or more IP address "subnets" into a single larger IP address subnet. In addition, the generator 102 is adapted to generate revised, master access lists each time a location (or VPN component) is modified, added to, or deleted from, a VPN (or network).

To generate the master access lists, the generator 102 is further adapted to generate secondary RECEIVE and SEND access lists, one for each VPN component identified by the identification section 101. It should be understood that although the master access lists have been discussed first, in reality the generator 102 is adapted to generate the secondary access lists first and then combined these lists to form the master access lists. The VPN components may be full-mesh, root-receiver or root-transmitter components. As with the master access lists described above, the generator 102 is further adapted to generate revised secondary lists each time a location (or VPN component) is modified, added to, or deleted from a VPN component (or network).

It should be understood that, after the generator 102 has generated the lists, the network interface section 103 is adapted to transfer the master/secondary RECEIVE and SEND lists to one or more routers $110_a$, $110_b$ ... $110_n$, in the network. The routers are then adapted to route communication traffic based on the transferred RECEIVE and SEND access lists.

In more detail, the generator 102 is adapted to generate the master and secondary access lists and the routers $110_a$, $110_b$ ... $110_n$, are adapted to so route traffic using such lists in accordance with the following, additional set of rules which may be made a part of one or more programs or hardware within the controller 100 and/or each router $110_a$, $110_b$ ... $110_n$:

General Rules for the Operation of the Access Lists:

Residing in each VR is a "default routing table" created via a routing protocol between VRs. For example, there are two standard routing protocols that are commonly used: Open Shortest Path First ("OSPF" specified in "RFC" 2328); and Routing Information Protocol ("RIP", "RFC" 2453). In addition, associated with each location connected to a VR are master access lists which are used to regulate traffic to and from the location. When criteria within the list indicates that a packet is to be forwarded, in general, the packet is forwarded according to the default routing table. In an alternative embodiment of the present invention, the generator 102 may be adapted to generate lists having an entry which may comprise an optional parameter, a so-called "interface ID". Each interface ID specifies a particular pathway that the packet should be forwarded to, overriding the default routing table. The forwarding pathway may be a physical interface or a virtual interface such as an ATM virtual circuit connection (VCC), frame relay VCC or MPLS label switched path.

For each connection between a network location and a VR, the generator 102 is adapted to generate two secondary-access lists for each VPN component (as identified by the identification section 101), referred to as the "vpn_component_id_rcv" and "vpn-component-id_send" lists, respectively. The abbreviation "vpn-component-id" is a value which identifies a VPN component. The master SEND access list is the sum total of all the "vpn_component_id"_send secondary access lists associated with a pathway. Likewise, the master RECEIVE access list is the sum total of all the vpn_component_id_rcv secondary access lists associated with a pathway.

Rules for Governing the Generation of Secondary Lists for Full Mesh VPN Components:

For each full mesh VPN component, the generator 102 is adapted to generate a vpn_component id_rcv sub-access list which allows a VR to receive packets from all other locations that belong to the same full mesh VPN component. For example, the access list may comprise an entry in the following form: "If origination address is from subnet_i, forward packet." "Subnet_i" is an IP subnet associated with location_i, a member of a particular full mesh VPN component. Each member of a full mesh VPN component should have such an entry in the list.

Similarly, for each full mesh VPN component, the generator 102 is adapted to generate a vpnid_send sub-access list which allows a location to send packets to other locations belonging to the same full mesh VPN component. For example, the access list may comprise a entry in the following form: "If destination address is from subnet_I, forward packet." Again, each member of a full mesh VPN component should have a corresponding entry in the list.

Rules Governing the Generation of Secondary Lists for Root-Receiver VPN Components:

For root receiver the VPNs, generator 102 is adapted to generate a vpn_component_id_rcv secondary access list which applies only to roots. This list enables the root to receive traffic from each branch. For example, the list may comprise an entry in following form: "if origination address is from subnet_i, forward packet." In this case, subnet_i is the IP subnet associated with location_i, a branch of the root receiver VPN component. In accordance with a further embodiment of the present invention, each leaf of a root receiver VPN should have a corresponding entry in an access list.

Similarly, the generator 102 is adapted to generate vpn_component_id_send secondary-access lists for each branch of a root-receiver VPN component. This list allows each branch to send packets to the root of root receiver VPN component. By way of example, the list may comprise an entry in the following form: "if destination address is from subnet_i, forward packet using interface x". Note that, in this case, an access list could override the default routing table as described previously.

Rules Governing the Generation of Secondary Lists for Root-Transmitter VPN Components:

For root transmitter VPNs, generator 102 is adapted to generate a vpn_component_id_send secondary access list which applies only to roots. This list enables a root to send packets to each branch. An example of such a list may comprise an entry in the following form: "if destination address is from subnet_i, forward packet." In this case, subnet_i is the IP subnet associated with location_i, a branch of a root receiver VPN component. Each branch of a root receiver VPN should have a corresponding entry in an access list.

Similarly, the generator 102 is adapted to generate vpn_component_id_rcv secondary-access lists for each branch of a root-receiver VPN component. Each list allows a branch to receive packets from the root of a root-transmitter VPN component. For example, the list may comprise a entry in the following form: "if origination address is from subnet_i, forward packet.

It should be noted that different customer locations connecting to a VR may have the same access list. In particular, locations that, in RFC 2547 terminology, export and import the same RTs, would have the same access lists. Taking this into account, it is possible to generate a reduced number of access lists.

The examples given above have sought to illustrate how the present invention envisions configuring IP-based VPNs by efficiently assigning RDs and RTs or by efficiently generating secondary and master access lists. Alternate embodiments will become apparent to those skilled in the art to which the present invention pertains without departing from its spirit and scope as defined by the claims which follow.

We claim:

1. A device for configuring an Internet protocol based, virtual private network comprising:
    an identification section for identifying basic components of the network, including full mesh, root-transmitter and root-receiver components where, for root-receiver components, transmissions are only allowed to, not from, a root node; and
    a routing generator adapted to generate routing data for each of the identified components.

2. The device in claim 1 wherein the identification section and routing generator comprise one or more programs.

3. The device as in claim 1 wherein the identification section further generates a first network connectivity matrix based on two-way communication paths associated with locations in the network.

4. The device as in claim 3 wherein the identification section further identifies all maximal, full-mesh components in the first matrix.

5. The device as in claim 4 wherein the identification section further identifies full-mesh components that comprise only two locations that share a common location, and converts such full-mesh components into a root-receiver and root-transmitter component with the common location as the root.

6. The device as in claim 3 wherein the identification section further generates a second network connectivity matrix based on one-way communication paths associated with locations in the network.

7. The device as in claim 6 wherein the identification section is further identifies root-receiver or root-transmitter components in the second matrix based on a set of rules.

8. The device as in claim 1 wherein the identification section further identifies root-transmitter components that have the same branches.

9. The device as in claim 8 wherein the identification section further associates the components having the same branches to one equivalent root transmitter component.

10. The device as in claim 1 wherein the identification section further identifies root-receiver components that have the same branches.

11. The device as in claim 10 wherein identification section further associates components having the same branches to one equivalent root-receiver component.

12. The device as in claim 1 further comprising a route distinguisher ("RD") assignment section for:
    assigning the same RD to all locations which are members, of the same full-mesh, identified component; and
    assigning a unique RD to each location which is a part of a root-receiver or root-transmitter, identified component.

13. The device as in a claim 1 further comprising:
    a route target ("RT") assignment section for assigning an RT to; each identified, full-mesh component; each identified, root-receiver component; each identified, equivalent root-receiver component; each identified, root-transmitter component; and to each identified, equivalent root-transmitter component.

14. The device as in claim 1 wherein the routing generator further:
   generates a RECEIVE, master access list of Internet protocol addresses for each network pathway associated with each identified component; and
   generates a SEND, master list of Internet protocol addresses for each network pathway associated with each identified component.

15. The device as in claim 14 wherein the routing generator further generates revised secondary access lists when a VPN component is modified, added, or deleted.

16. A method for configuring an Internet protocol based, virtual private network comprising:
   identifying basic components of the network, including full mesh, root-transmitter and root-receiver components where, for root-receiver components, transmissions are only allowed to, not from, a root node; and
   generating routing data for each of the identified components.

17. The method as in claim 16 further comprising generating a first network connectivity matrix based on two-way communication paths associated with locations in the network.

18. The method as in claim 17 further comprising identifying all maximal, full-mesh components in the first matrix.

19. The method as in claim 18 further comprising:
   identifying full-mesh components that comprise only two locations that share a common location; and
   converting such full-mesh components into a root-receiver and root-transmitter component with the common location as the root.

20. The method as in claim 18 further comprising generating a second network connectivity matrix based on one-way communication paths associated with locations in the network.

21. The method as in claim 20 further comprising identifying root-receiver or root-transmitter components in the second matrix based on a set of rules.

22. The method as in claim 16 further comprising identifying root-transmitter components that have the same branches.

23. The method as in claim 22 further comprising associating the components having the same branches to one equivalent root transmitter component.

24. The method as in claim 16 further comprising identifying root-receiver components that have the same branches.

25. The method as in claim 24 further comprising associating components having the same branches to one equivalent root-receiver component.

26. The method as in claim 16 further comprising:
   assigning the same route distinguisher "RD" to all locations which are members, of the same full-mesh, identified component; and
   assigning a unique RD to each location which is a part of a root-receiver or root-transmitter, identified component.

27. The method as in a claim 16 further comprising assigning route target "RT" to each identified, full-mesh component; each identified, root-receiver component; each identified, equivalent root-receiver component; each identified, root-transmitter component; and to each identified, equivalent root-transmitter component.

28. The method as in claim 16 further comprising:
   generating a RECEIVE, master access list of Internet protocol addresses for each network pathway associated with each identified component; and
   generating a SEND, master list of Internet protocol addresses for each network pathway associated with each identified component.

29. The method as in claim 28 further comprising generating revised secondary access lists when a VPN component is modified, added or deleted.

* * * * *